Figure 1:
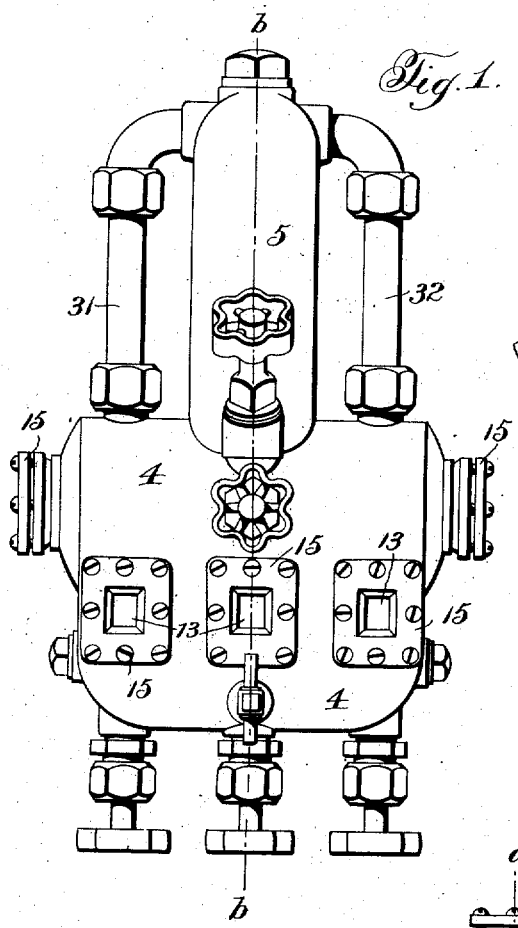

No. 12,454. REISSUED FEB. 20, 1906.

C. B. & F. W. HODGES.

LUBRICATOR.

APPLICATION FILED MAR. 3, 1905.

3 SHEETS—SHEET 1.

Witnesses:

Jas. E. Hutchinson.

G. A. Marvin.

Inventors:

Clarence B. Hodges, and

Frederick W. Hodges.

By James Whittemore Attorney.

No. 12,454. REISSUED FEB. 20, 1906.

C. B. & F. W. HODGES.

LUBRICATOR.

APPLICATION FILED MAR. 3, 1905.

3 SHEETS—SHEET 2.

Witnesses:

Jas. E. Hutchinson.

G. A. Marvin.

Inventors:

Clarence B. Hodges, and

Frederick W. Hodges.

By James Whittemore Attorney.

No. 12,454. REISSUED FEB. 20, 1906.

C. B. & F. W. HODGES.

LUBRICATOR.

APPLICATION FILED MAR. 3, 1905.

3 SHEETS—SHEET 3.

Witnesses:

Jas. E. Hutchinson.

G. A. Marvin.

Inventors:

Clarence B. Hodges, and

Frederick W. Hodges,

By James Whittemore Attorney.

UNITED STATES PATENT OFFICE.

CLARENCE B. HODGES AND FREDERICK W. HODGES, OF DETROIT, MICHIGAN.

LUBRICATOR.

No. 12,454. Specification of Reissued Letters Patent. Reissued Feb. 20, 1906.

Original No. 752,554, dated February 16, 1904. Application for reissue filed March 3, 1905. Serial No. 248,335.

*To all whom it may concern:*

Be it known that we, CLARENCE B. HODGES and FREDERICK W. HODGES, citizens of the United States, residing at Detroit, in the county of Wayne and State of Michigan, have invented certain new and useful Improvements in Lubricators, of which the following is a specification, reference being had to the accompanying drawings, forming part thereof.

This invention relates more specifically to that class of lubricators primarily designed for use in connection with locomotives and wherein the lubricant rises from a suitable receptacle in drops through a body of water into the tallow-pipe and passes thence to the points at which the lubricant is to be used—as the locomotive-cylinders, the air-brake engine-cylinder, or other parts—the invention being capable of extension in the number of oil-feeding tubes as may be required.

There are what may be termed three classes of lubricating devices, the first being of the type in which a drop of oil falls through a sight-feed glass to the part to be lubricated, the second of the condensation-displacement type in the simpler form, and the third of the balanced condensation-displacement type, in which last class, used more especially upon locomotives, the boiler-pressure is carried from a point in the condenser above the water-level through equalizing-tubes, located either internally or externally to the top of the column of water, through which the drop of oil rises from the sight-feed nozzle to the point of exit.

Our invention, while, as above stated, more particularly designed for use with the last-named class of lubricators, is applicable to each of the others or, in fact, to any class of lubricators in which drops of oil or water are used to indicate the condition or rate of the feeding operation.

In the usual design adopted for condensation-displacement sight-feed lubricators the oil-reservoir is cylindrical in form, the axis of such cylinder being in a vertical position with the arms or projections carrying the sight-feed features radiating from the center. In that form the number of sight-feed features is arbitrarily limited by the diameter or circumference of the reservoir, and as the number of sight-feed features is increased it becomes necessary to place one or more of them on the opposite side of the cylindrical reservoir, so that they are not all visible from one side, or else to increase the diameter of the reservoir. Such enlargement in diameter is objectionable, involving decrease in both of the horizontal dimensions of the space to be occupied by the device, which under frequent conditions must be very limited. To enlarge the capacity of that form of reservoir, it is necessary to increase either its diameter or its vertical dimension, which is equally objectionable. In our invention space is economized by placing the axis of the oil reservoir or chamber carrying the sight-feed features in a horizontal position, at the same time dispensing as far as practicable with all projecting parts, thus making it possible to have all the sight-feed features visible from the front or side of the lubricator, as the case may be. It is not our intention to limit the form of this oil reservoir or chamber to a cylinder whose axis lies in a horizontal plane, for an elliptical, rectangular, or other form which admits of increasing its capacity or number of sight-feeds without adding to its vertical dimensions or more than one of its horizontal dimensions will, as accomplishing the same results, be within the scope of our improvement.

In the prior construction of lubricators aiming to accomplish the objects here in view many exterior connections have been employed, with their valves and other adjuncts, requiring much packing and care, together with exterior tubular sight-feed and gage glasses, which are liable to burst from extreme pressures or various other causes, such tubular glasses being closely confined at their ends within fittings or projections from the oil-reservoir or its adjuncts, and these fittings or projections being placed one above the other and some distance apart insufficient provision is made for the expansion of such tubular glasses or the difference in expansion between them and the metal body of which these projections are a part. Again, these tubular glasses are at times subjected to severe torsional strain due to the turning of nuts or stuffing-boxes which contain the packing in which the upper and lower ends are confined in opposite directions, this action alone resulting in the breakage of many glasses even where there is no pressure on the lubricator. It is necessary with the tubular form of glass that the fittings or projections confining the ends of the glass shall be in perfect alinement, and it has been found in many cases that from various causes—such, for example, as from excessive pressure within the oil-reservoir, which would cause it to bulge or swell—these fittings are thrown out of such alinement, with the result that the glass is subjected to a cross-strain sufficient to cause it to burst. Such tubular glasses, because of their liability to burst from extreme pressures, changes in temperature, or under other conditions, are a menace to the persons near them. Therefore to avoid such danger and the attendant inconvenience and delay resultant from the bursting of a glass one of the objects of our invention is to dispense with such tubular glasses and to substitute therefor sight-feed glasses of bull's-eye type of novel form and arrangement, all glasses and fittings being placed so far as possible within or partly within the body of the lubricator or integral parts thereof, thus insuring the use of the glasses under the best conditions, reducing the number of projecting parts and avoiding a multiplicity of joints. Safety is thus insured, space economized, and cleaning facilitated.

Another important feature of our invention consists in placing two or more sight-feed glasses of the bull's-eye type or its equivalent in a row or in such position whereby they may all be visible from one side or from one point of view, thus enhancing the facilities of observation, which glasses as the lubricator is extended to serve an enlarged number of points for lubrication may be correspondingly increased in number, thereby adapting the invention to the present and commonly-known systems, as the double-sight and triple-sight feed systems, or to the quadruple and other forms of sight-feed. This advantage in the facility for increasing the number of feeds attends the placing of the axis of the oil-reservoir carrying the sight-feed glasses in a horizontal position and in arranging the sight-feed features in one or more rows, so that they may all be visible from one side.

It is known that the oil-reservoir may be subjected at times to pressures greatly exceeding that of the boiler, due to the expansion of the heated oil, and it therefore becomes essential that said reservoir shall be of great strength. Heretofore it has been found impracticable in condensation-displacement lubricators to construct the shell of the oil-reservoir with flat surfaces or those of other than cylindrical form, and a further feature of our invention consists in placing within the oil-reservoir, and preferably, but not necessarily, in a horizontal plane, a tubular chamber or chambers containing the sight-feed glasses, each of which chambers (extending from one side of the shell of the reservoir to the other side) being either an integral part thereof or firmly attached thereto serves the double purpose of a stay for the shell of the reservoir and as a support for a sight-feed feature. Each chamber is intersected at some point within its length by an oil-feed pipe adapted to contain the column of water through which the drop of oil rises after leaving the sight-feed nozzle. Each oil-feed pipe or a continuation thereof, in connection with its intersecting chamber, forms a bracing for the shell of the reservoir, making practical the use of a reservoir of other than cylindrical form.

A further feature of our invention consists in the special construction of the observation-glasses, which may be of varied forms, the preferred one being such as utilizes the principle of internal reflection and enables the glass to constitute in itself a mirror, and thus greatly widen the field of observation, so that the attendant in order to see the ascending drop of oil is not obliged to stand immediately in front of the observation-glass, but may stand at a considerable distance at either side of the axis or longitudinal center thereof, an advantage which will be readily appreciated by those skilled in this art. The glass may be either round or rectangular or of other polygonal form in cross-section, cylindrical, frusto-conical, or of a form including any modification or combination of such of these shapes as is adapted to the purpose, the glass being at all times of sufficient thickness to withstand any pressure to which it may be subjected and to produce effects hereinafter mentioned.

Another feature of our invention affords special opportunities for packing the glass in the form herein contemplated or any equivalent thereof by the use of a gasket or other body or substance suitable for packing, whereby a joint may be made with but little pressure upon the glass, while at the same time affording it great freedom for expansion.

Our invention enables us to eliminate from this form of lubricator all such safety devices as automatic valves, glass-guards, auxiliary oilers, by-pass valves, &c., which are placed in the common types of lubricators to protect the attendants against the results of the bursting of the tubular glasses, and thus to materially decrease the number of parts and joints, and consequently the cost of manufacturing, as well as lessen the complication and danger of operation.

Other and more general features of our invention are intended to further increase the effectiveness of lubricators of this class, while greatly simplifying them, lessening cost, and otherwise rendering them more fully adapted to the purposes and the varied uses to which they are subjected.

Figure 2:
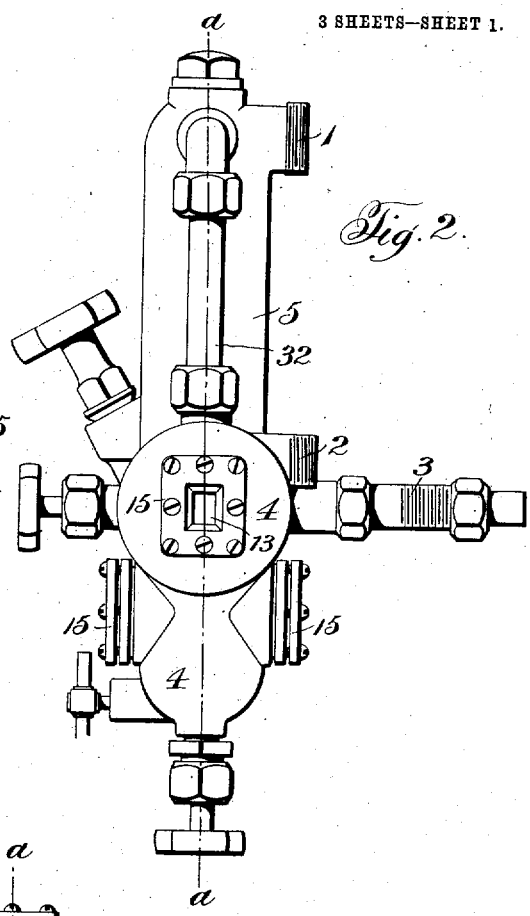
Figure 3:
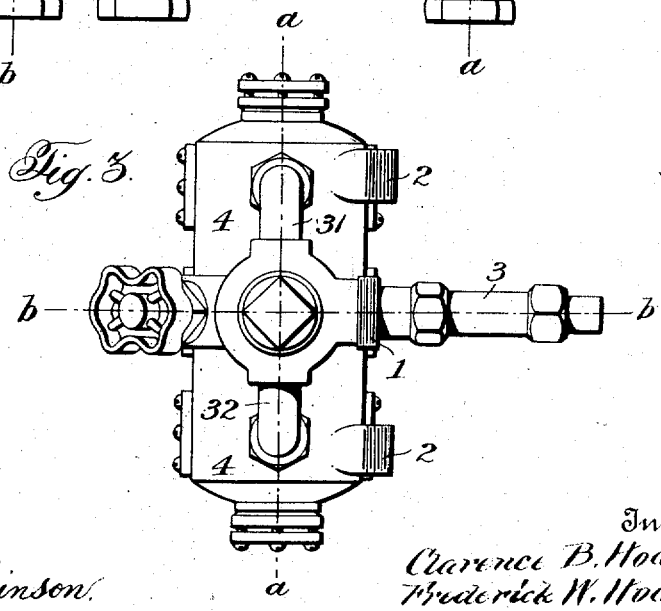
Figure 4:
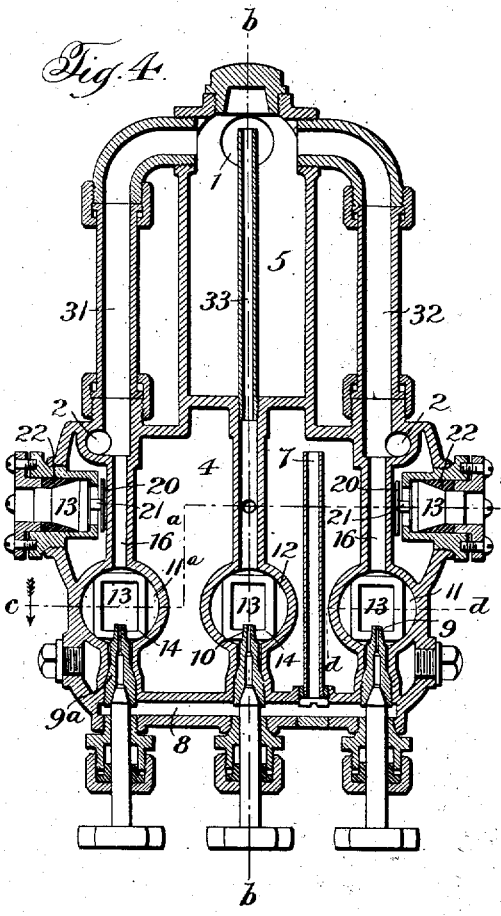
Figure 5:
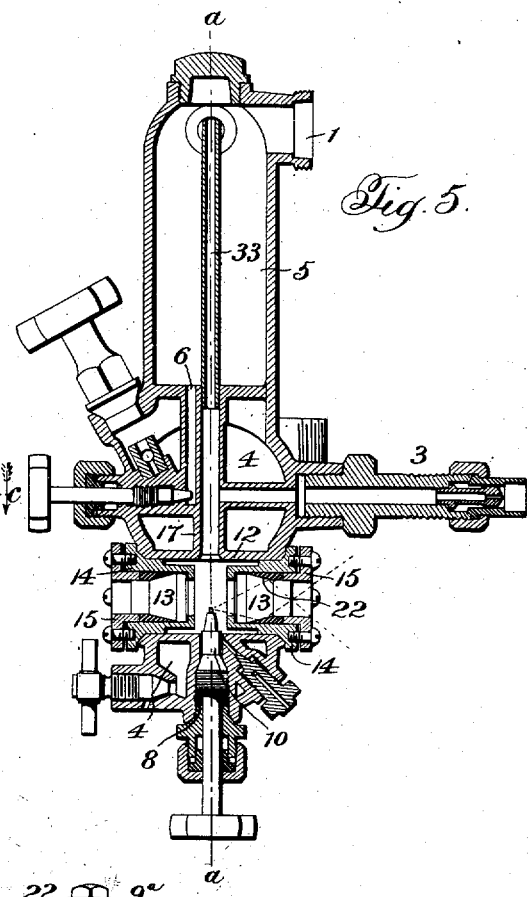
Figure 4A:
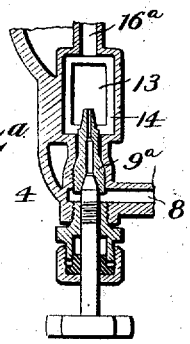
Figure 6:
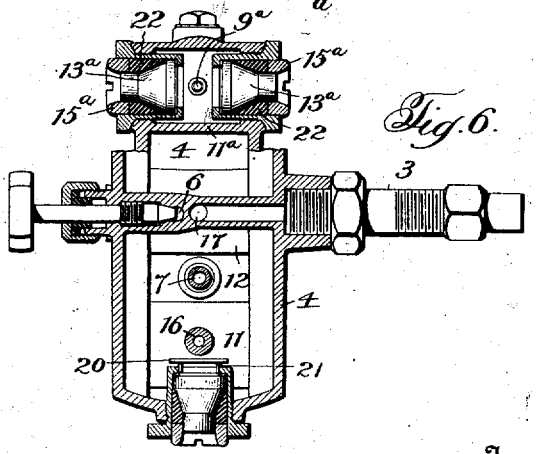
Figure 7:
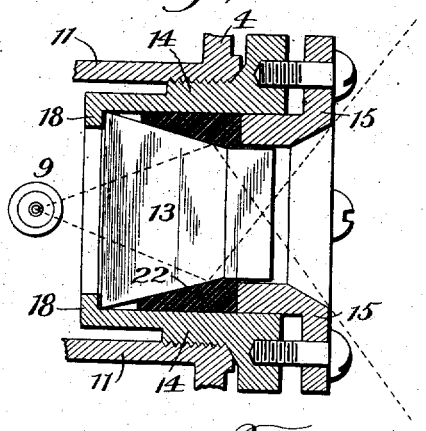
Figure 8:
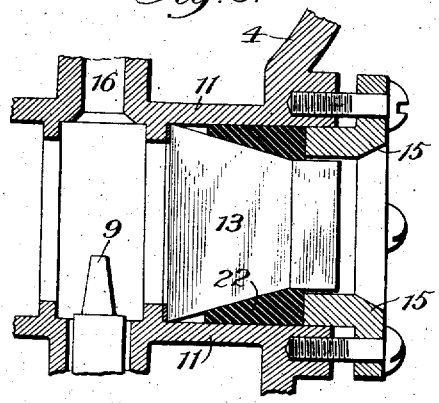
Figure 9:
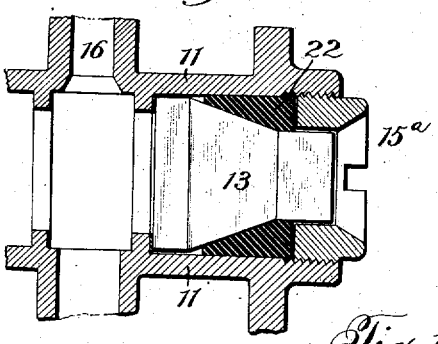
Figure 10:
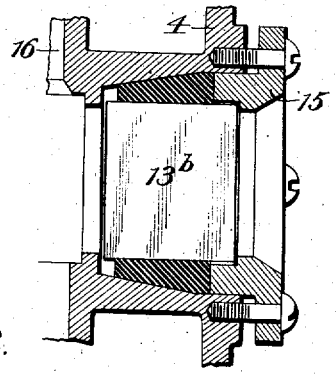
Figure 11:
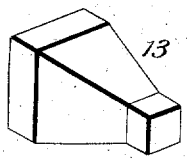
Figure 12:
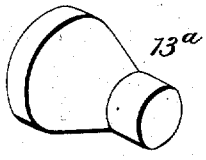
Figure 14:
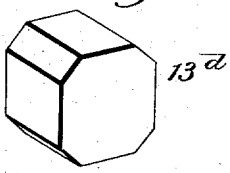

In the accompanying drawings, Figure 1 is a front elevation of our invention; Fig. 2, a side elevation; Fig. 3, a plan; Fig. 4, a section on the line *a a* of Figs. 2 and 3; Fig. 4ª, a modification of a portion of Fig. 4; Fig. 5, a section on the line *b b* of Figs. 1 and 4; Fig. 6, a horizontal section on the line *c c* of Fig. 4, showing the mounting of sight-feed glasses or bull's-eyes of modified form; Fig. 7, an enlarged view of the sight-feed glass and its cell in section on the line *d d* of Fig. 4, and Fig. 8 a modified form of the device shown in Fig. 7. Figs. 9 and 10 illustrate further modifications. Figs. 11 to 14, both inclusive, are perspective views of several shapes in which our sight-feed glasses or bull's-eyes are capable of use.

Similar numerals of reference indicate similar parts in the several figures.

1 represents a branch for a steam-pipe leading from the boiler.

2 2 indicate tallow-pipe connections leading to cylinders on opposite sides of the locomotive, and 3 shows the oil-feed pipe leading to the engine-cylinder of the air-brake. The oil-reservoir 4 receives the oil and the water of condensation, the latter forming in the condenser 5 and dropping by gravity through a passage 6 into the reservoir 4. The accumulating water, as is common in this class of lubricators, raises the oil to the top of the reservoir, whence it is fed through a tube 7 to the chamber 8, to which are connected the oil-feed nozzles 9, 9ª, and 10, those 9 9ª supplying oil to the locomotive-engine cylinders, while that 10 is used for supplying it to the air-brake engine-cylinder. As shown in several of the figures, the oil-reservoir 4, the axis of which is horizontal, is provided with three (preferably horizontal) tubular chambers 11, 11ª, and 12, in which are secured the cells or casings 14, containing the observation-glasses or bull's-eyes 13. By the term "tubular" is meant any tubular form, whether cylindrical, rectangular, or of other shape in cross-section. In the form of our invention illustrated in Figs. 4, 5, and 7 the tubular chambers 11, 11ª, and 12 are each cylindrical in cross-section and internally threaded to receive the exteriorly-threaded cells 14, in or to which are fitted the observation-glasses 13 and their packings and caps 15, while, as represented in Figs. 4ª and 8, the tubular chamber is rectangular in cross-section and the observation-glass secured directly in the chamber and not in a cell 14. Where a glass 13ª or 13ᶜ circular in cross-section is employed, the exterior cap 15ª is annular and is screwed into the end of the cell 14, as shown in Figs. 6 and 9; but as employed with the preferred form of glass (that of polygonal shape in cross-section) the cap is as seen in the remaining figures illustrating this feature. These observation-glasses or bull's-eyes, with their adjuncts, will be more fully described hereinafter.

31, 32, and 33 are the equalizing-tubes shown in Figs. 1, 2, 3, and 5. These equalizing-tubes, as shown, form independent passages leading at their upper ends from the steam-space of the condensing-chamber and communicating with the chambers 11, 11ª, and 12.

The horizontal tubular chambers 11, 11ª, and 12 are in practice parts of the oil-reservoir, preferably integral therewith, as are also the intersecting oil-pipes 16, 16ª, and 17, (see Fig. 4,) the combined construction adapting the reservoir to withstand the higher pressures, as above mentioned. The pipes 16, 16ª, and 17 contain the columns of water which carry the oil from the reservoir to the outlet-pipes and are necessarily in line with the nozzles 9, 9ª, and 10, as clearly indicated in Fig. 4. The peculiarity of constructing the oil-reservoir with a horizontal axis, before referred to, readily admits of the extension of its length with the intent of increasing the capacity of the lubricator to serve the purposes of a quadruple or more extended system of oil-feeding. It is our intention to claim in a lubricator an oil-reservoir of any form that will permit of an increase in its capacity or of the number of sight-feed features by enlargement in one of its horizontal dimensions, whether such reservoir be of cylindrical, rectangular, or other form, permitting of such increase by an extension in any direction other than the vertical, and also such construction as shall admit of the placing of the sight-feed features in a manner enabling all of them to be visible from one side of the device.

It will be seen that the chambers 11, 11ª, and 12, in which are inserted the observation-glasses, are substantially within the compass of the oil-reservoir, there being in consequence and because of the disuse of the ordinary exterior tubular sight-feed glasses and their fittings few projecting parts, the advantage of which arrangement will be at once seen. By reference to Figs. 5 and 6 it will be found that the oil-feed nozzles 9, 9ª, and 10 are each located between two observation-glasses 13, the latter being arranged with their axes in line, so that the light may readily pass through the glasses, thus enabling the ascending drop of oil to be distinctly visible to the observer, this being true of the observation-glasses whether used for indicating the supply of oil to the locomotive-cylinders or to the air-brake engine-cylinder. By enlarging the capacity of the oil-reservoir—that is to say, by increasing its length—additional series of chambers 11, 11ª, and 12, with their oil-feed nozzles and observation-glasses, &c., may be employed, adapting the device to the lubrication of a greater number of parts, while at all times these chambers, with the observation-glasses, will be still contained within the compass of an oil-reservoir, and the advantage of internal bracing due to the combination of the horizontal chambers 11, 11[a], and 12 and the oil-pipes 16, 16[a], and 17, intersectingly connected therewith, will be retained.

It is unnecessary to describe the tubular connections, valves, &c., controlling the oil-supply exits, &c., they being of approved character and capable of change or modification without essential variation from the main features of our invention.

Referring now more particularly to the construction and arrangement of the form of sight-feed or observation glasses, here shown of the bull's-eye type, and to their cells, packing, and mode of retention within the cells, attention may be first directed to Fig. 7. In that figure the cell 14 is externally threaded and screwed within the cylindrical chamber 11 and furnished at its inner end with an internal annular shoulder 18. The outer side of this shoulder is lined with a packing, against which rests the end of an observation-glass or bull's-eye 13, the latter being rectangular or square in cross-section throughout all parts of its length, as shown in perspective in Fig. 11. From that figure it will be seen that the glass is of substantial thickness and provided with parallel ends, the main body of the glass being pyramidal in form, the base and the flattened apex of which unite with the square end portions, as shown. The glass is retained within the cell by means of the flanged cap 15, secured by screws to the cell, as shown. The glass 13 is provided with a packing 22, hereinafter more particularly described. The outer face of the glass 13 need not necessarily extend to the outer face of the cap. Fig. 5 indicates the function of this feature of our invention. As the drop of oil ascends from the nozzle 9 through the water and between two observation-glasses of the type shown, it is obvious that not only will the drop be seen as it ascends from a point immediately in front of or in the axial line of the glass, but that from the shape of the glass its ascent may be seen at a considerable distance at either side, above, or below such axis, due to internal reflection, as shown by the dotted lines in said figure and in Fig. 7. Heretofore, so far as we are advised, no attempt has been made to obtain this character of reflection, and in all cases it has been necessary in order that the attendant shall see the drop of oil, which ascends with some degree of rapidity, that he shall stand approximately in front of the glass. In the use of our invention the attendant, although occupied with other duties in the cab requiring his attention at a distance from the observation-glass and having his range of vision at the moment of desired observation considerably to one side of or out of line with the axis of the glass, may still clearly see the ascent of the drop of oil from the nozzle, an advantage which will be readily appreciated by those skilled in this art.

Figure 13:
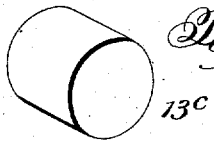

While in Figs. 4, 5, and 7 the preferred shape of observation-glass has been shown, it is within the scope of our invention to modify such shape. Thus in Figs. 6 and 12 the glass 13[a] is indicated as having a central portion of frusto-conical form with cylindrical end portions and in Fig. 10 as square in cross-section, the distinction in the latter figure being that the glass 13[b] has parallel sides, being in the geometrical form of a square prism. The use of the latter form of glass is also highly effective, in that the drop of oil being reflected by the parallel sides of the glass may be distinctly observed, due to this reflection, at a wide angle of divergence from the axis of the glass. A cylindrical glass 13[c] is shown in Fig. 13 and one, 13[d], of substantially octagonal form with parallel sides in Fig. 14. The provision of means for reflecting the drop of oil by a surface forming a part of the observation-glass is an essential feature of our invention, and any form of glass which will serve as a mirror or produce the effect of internal reflection, so that the drop of oil may be seen from a point of observation divergent from the axis of the glass, is intended to be and is claimed as within the scope of our improvement. In all forms of our invention in which our observation-glass or bull's-eye is employed two of such glasses, except as hereinafter specified, are placed in an axial line, so that the light shall be reflected through both glasses and the drop of oil may be seen by the attendant from either side of the lubricator. As a modified form of this feature, however, but one glass may be employed and used with an opaque, white, or polished reflecting-surface in the rear, although in the more complete form of this device the use of two glasses in line where practicable is preferred. The same general features of our invention are employed to ascertain the height of oil in the oil-receptacle, and for this use one glass is used at each side of the lubricator, there being an opaque reflecting device 20 in the rear of each glass. As shown in Figs. 4 and 6, this reflecting device is of thin metal, having a highly-polished or white surface and provided with fingers 21 or other means for attaching it to the end of the cell. It is also our intention to cover, broadly, in a lubricating apparatus a cylindrical (see Fig. 13) or other form of glass which by reason of its formation and thickness will concentrate and reflect the light from the exterior to the interior of the apparatus. In all forms of bull's-eye glasses heretofore used, so far as we are informed, the glasses have been so thin as to prevent the obtaining of this effect from the side of the glass. It is not our wish to use a thick glass to produce a lens for magnifying the size of the drop, but to produce the result above stated. While a glass productive of a mirror effect for reflecting the contents of the chamber is the form preferred by us, it is our purpose to claim, broadly, as a feature of our invention a cylindrical or other form of glass of sufficient thickness to concentrate and reflect the light from the exterior to the interior, the reflecting-surface being obtained from the sides of the glass.

It is obvious that where the sight-feed nozzle is placed substantially in the center of the oil-reservoir if a thin glass is used situated substantially at the end of the tubular chamber that contains the sight-feed feature the body of water within this chamber will occupy so great a portion of its length that in case the water becomes slightly discolored it will be impossible to see the sight-feed nozzle or the drop of oil. Again, if the glass is set so that it is close to the sight-feed nozzle, thereby limiting the column of water to its proper dimensions, the glass will be so far within the chamber that without some reflecting-surface the interior of the chamber will be dark. By using a long cylindrical glass, or, in fact, any form of thick glass, and taking advantage of its peculiar reflecting properties when made with polished surfaces two useful results are accomplished: First, a small body of water is secured surrounding the sight-feed nozzle, and, secondly, one face of the glass being placed substantially at the end of the chamber the thickness of the glass serves to intensify rather than decrease the light within the chamber.

An important practical advantage provided by our invention consists in the facility with which the observation-glass of the type here shown and as herein variously modified may be packed, so that the minimum pressure is exerted upon the glass, while great freedom is yet afforded it for expansion. This packing varies in accordance with the shape of the glass and may be of any suitable substance. In the drawings it is generally represented by 22. The packing constitutes, in effect, a wedge, which may be tightly closed around the glass on forcing up the cap 15, and it is apparent that an absolutely tight joint may be obtained without exerting too great pressure upon the glass, the shape of which, however, enables it to withstand any pressure required to make the joint effective. The wedge-packing brings the pressure on the sides rather than on the end of the glass, thereby enabling the size of the opening to be equal to that of the glass.

In our form of lubricator it will be observed that the water serving as the medium for conveying the drop of oil from the feed-nozzles is inclosed in metal, the inclosure having an opening or openings which, being filled with glass, form, in effect, a part of the casing. The sight-feed elements of our lubricator may be confined wholly within the body of the lubricator or placed partly or wholly exterior of the same. In one form of this feature of our invention the observation-glasses are held in metal cells adapted to be removed for the purpose of cleaning or otherwise without disturbing the packing of the glass. By the use of a glass conical in shape or in the form of a frustum of a cone or square or polygonal in cross-section or any modification of such shapes, as herein shown, not only is the method or packing improved and facilitated, but if the glass is inserted with the smaller end outward the pressure from within the lubricator will necessarily tend to drive the glass more tightly into the packing and at the same time the danger from flying pieces in the event of possible breakage is greatly reduced, owing to the smaller opening in the metal at the outer end. In the use of any glass tapering in form the effect, so far as facility of observation is concerned, is substantially the same as is produced by the use of a cylindrical glass of the same diameter as the larger end of the conical glass or of the larger opening in the casing. It is intended that the scope of this invention shall include any glass which by its reflecting properties shall render visible the ascending drop of oil passing the glass at either side of the line of vision. We prefer the glass to be square or rectangular in cross-section or of any shape, having one or more flat surfaces at its sides and ends, which surfaces as mirrors perfectly reflect the drop as it passes the end of the glass, thereby increasing the range of vision to a great extent, and it is our intention to claim, broadly, any device productive of internal reflection in glasses placed within, partly within, or without the body of the lubricator. In all forms of our glass we prefer that its front and rear ends shall be substantially parallel. The packing, whatever its form, whether square or round, is of practically wedge shape viewed in longitudinal or axial section, and either the larger or smaller end may be placed outwardly. These details of our invention may be greatly varied without departing from the spirit thereof.

While the lubricator has been described as of that general class in which drops of oil are caused to ascend through a body of water, thereby becoming visible to the observer, it is within the scope of our invention to combine our sight devices with that class of lubricators in which drops of water pass through the oil, and this is true whether by such sight devices are meant two glasses arranged in axial line or one glass with an opaque body having a painted or polished surface in the rear of the glass between which and the glass the liquid passes for observation. This invention is also applicable in any way as a means for facilitating observation of the height, position, or movement of a liquid employed in a lubricating apparatus.

We do not restrict ourselves to the exact details of construction, combination, and arrangement herein set forth, it being obvious that minor variations thereof not involving the exercise of invention may be made by the skilled mechanic, and such departures from what is herein described and claimed not involving invention we consider as within the scope and terms of our claims.

Having thus described our invention, we claim—

1. In a condensation displacement lubricator, an oil-reservoir having its axis in a substantially horizontal plane and its interior braced by tubing, combined with sight-feed glasses having horizontal axes and being mounted within portions of said tubing, substantially as set forth.

2. In a lubricating apparatus, a condensing-chamber and an oil-reservoir, the latter having its axis in a substantially horizontal plane, and horizontal and vertical tubes within the reservoir for bracing the same, the whole being integral, combined with sight-feed glasses having horizontal axes and being mounted within portions of said tubular bracing, substantially as set forth.

3. In a condensation displacement lubricator, an oil-reservoir having one or more tubular braces extending from side to side of the reservoir, and oil-feed tubes extending between points in the shell of the reservoir above and below the horizontal plane in which said tubular braces lie and intersecting said braces, substantially as set forth.

4. In a lubricating apparatus, an oil-reservoir having its axis in a horizontal plane, tubular braces extending from side to side of the reservoir, and oil-feed tubes intersecting said braces and extending through said reservoir, combined with sight-feed glasses having horizontal axes and being removably mounted in pairs in said tubular braces, substantially as set forth.

5. In a lubricating apparatus, an oil-reservoir having its axis in a horizontal plane, interior tubular braces extending from side to side of the reservoir, and oil-feed tubes intersecting said braces and extending through said reservoir, the entire structure being integrally formed, combined with sight-feed glasses in pairs, each pair having a common horizontal axis and being mounted in one of said interior tubular braces, substantially as set forth.

6. In a lubricating apparatus, an oil-reservoir the side walls of which are interiorly connected and braced by tubular chambers, and provided with oil-feed tubes intersecting said chambers and extending between the walls of the reservoir, substantially as set forth.

7. In a lubricating apparatus, an oil-reservoir the side walls of which are interiorly connected and braced by a tubular chamber, and an oil-feed tube extending from said tubular chamber to the top and bottom walls of said reservoir, said reservoir, chamber, and oil-feed tubes being integral, substantially as set forth.

8. In a lubricating apparatus, an oil-reservoir the opposite sides of which are connected by a tubular brace or chamber, the said brace or chamber being intersected by an oil-feed tube combined with sight-feed glasses supported by said tubular brace or chamber, substantially as set forth.

9. In a lubricating apparatus, an oil-reservoir having its axis in a horizontal plane and being provided with a series of horizontal tubular braces or chambers connecting its interior sides, and oil-feed pipes intersecting said braces or chambers, combined with sight-feed glasses arranged in pairs, each pair having a common axis and being supported by one of said tubular braces or chambers, substantially as set forth.

10. In a lubricating apparatus, an oil-reservoir having a series of parallel tubular braces or chambers interiorly connecting its sides, and oil-feed pipes intersecting and extending from said tubular braces or chambers to the walls of said reservoir, combined with sight-feed glasses supported by each tubular brace or chamber, substantially as set forth.

11. In a lubricating apparatus, an oil-reservoir having its axis in a horizontal plane and being provided with a series of tubular braces or chambers connecting its interior sides, and oil-feed pipes intersecting such braces or chambers, combined with sight-feed glasses arranged in pairs, each pair having a common axis and being removably mounted in one of said tubular braces or chambers, substantially as set forth.

12. In a lubricating apparatus, an oil-reservoir having a series of tubular braces or chambers connecting its interior sides, and oil-pipes intersecting such braces or chambers, combined with a sight-feed glass in each end of each of said tubular braces or chambers, substantially as set forth.

13. In a lubricating apparatus, an oil-reservoir having a series of tubular braces or chambers connecting its interior sides, and oil-feed pipes intersecting said braces or chambers and extending between the walls of the reservoir, combined with sight-feed glasses arranged in pairs, each pair having a common axis and being removably mounted in one of said tubular braces or chambers within the body of said reservoir, substantially as set forth.

14. In a lubricating apparatus, an oil-reservoir having a series of tubular braces or chambers connecting its interior sides, and oil-feed pipes intersecting said braces or chambers and extending between the walls of the reservoir, combined with a sight-feed glass in each end of each of said tubular braces or chambers within the body of said reservoir, substantially as set forth.

15. In a lubricating apparatus, an oil-reservoir having a series of parallel tubular braces or chambers interiorly connecting its sides, and parallel oil-feed pipes intersecting and extending from said tubular braces at a right angle thereto to the walls of said reservoir, combined with a sight-feed glass in each end of each of said tubular braces or chambers within the body of said reservoir, substantially as set forth.

16. In a lubricator, the combination of a condensing-chamber, an oil-reservoir, and a series of sight-feed features connected thereto, each sight-feed feature comprising a sight-feed chamber, sight-feed glasses at opposite ends thereof, a single nozzle for delivering oil, and an independent equalizing-tube leading from the steam-space of the condenser, the sight-feed chambers being so arranged that three of them are visible from common points of observation on opposite sides.

17. In a condensation displacement lubricator, an oil-reservoir and a condensing-chamber, the walls of which reservoir are interiorly connected and braced by one or more tubular chambers, combined with sight-feed glasses supported in said tubular chambers, and oil-feed pipes intersecting said chambers and having at their lower ends valve-controlled passages for permitting the flow of oil from the oil-reservoir, substantially as set forth.

18. In a lubricator, the combination of a condenser and an oil-reservoir the latter having an oil-feed pipe passing vertically therethrough, a tubular chamber supported within the oil-reservoir and intersected by the oil-feed pipes, an oil-delivery nozzle entering said tubular chamber, and a sight-feed glass placed on each side of said nozzle and supported by said chamber, substantially as set forth.

19. In a lubricator, the combination of a condenser, an oil-reservoir having oil-feed pipes passing therethrough, a tubular chamber connected to each oil-feed pipe, each of said chambers extending between the opposite walls of said reservoir, a sight-feed glass in each end of each chamber, and an oil-delivery nozzle situated between each pair of sight-feed glasses, substantially as set forth.

20. In a lubricator, the combination of an oil-reservoir containing within itself an oil-feed pipe having an enlarged portion extending between and connected to the side walls of said reservoir, a glass in each end of said enlarged portion, and a nozzle arranged to deliver oil between said glasses, substantially as set forth.

21. In a lubricator, the combination of an oil-reservoir, vertical oil-feed pipes passing therethrough, each pipe having oppositely-arranged enlarged horizontal branches, and observation-glasses removably mounted in said enlarged horizontal branches within the compass of the reservoir, substantially as set forth.

22. The combination in a sight-feed lubricator, with a water-chamber and a nozzle through which the oil is delivered in drops in order to ascend through the water in said chamber, of an observation-glass or bull's-eye having a side or surface adapted to internally reflect, so as to be visible to the observer, the position and movement of the lubricant, substantially as set forth.

23. A lubricator having a sight-feed passage combined with an observation-glass so constructed as to constitute a mirror by internal reflection and adapted to reflect for observation the position and movement of liquid behind the glass, substantially as set forth.

24. The combination, in a sight-feed lubricator, with a water-chamber and a nozzle through which the oil is delivered in drops to the water in said chamber, of an observation-glass or bull's-eye having polished surfaces adapted to internally reflect, so as to be visible to the observer, when out of the direct line of sight, the position and movement of the lubricant, a casing in which said bull's-eye is retained, a packing for said bull's-eye, and a cap for the casing, substantially as set forth.

25. The combination, in a sight-feed lubricator, with a water-chamber and a nozzle through which the oil is delivered in drops in order to ascend through the water in said chamber, of an observation-glass or bull's-eye having a polished surface, or surfaces, at an angle to its longitudinal axis, a packing adapted to the shape of said surface or surfaces, a casing to receive said bull's-eye, and a retaining-cap for the casing, substantially as set forth.

26. In a lubricator, the combination with an observation-chamber through which the oil ascends in drops, of a thick observation-glass having parallel front and rear ends, and side surfaces adapted to inwardly direct rays of light in order to exhibit the position and movement of liquid behind the glass, substantially as set forth.

27. In a lubricating apparatus, an oil-reservoir having an integral horizontal tubular chamber extending therethrough and an oil-feed pipe intersecting said chamber, combined with cells adapted to be fitted within the tubular chamber, and observation-glasses mounted in said cells, substantially as set forth.

28. In a lubricating apparatus, an oil-reservoir having a horizontal tubular chamber extending therethrough and an oil-feed pipe intersecting said chamber, combined with cells adapted to be removably fitted within said tubular chamber, and observation-glasses removably mounted in said cells, substantially as set forth.

29. In a lubricating apparatus, an oil-reservoir having a tubular chamber forming a part thereof, and an oil-feed pipe intersecting said chamber, combined with observation-glasses connected so as to constitute mirrors by internal reflection, said glasses being removably mounted within said chamber, substantially as set forth.

30. In a lubricating apparatus, an oil-reservoir having a tubular chamber forming a part thereof, and an oil-feed pipe intersecting said chamber, combined with cells fitted to said tubular chamber, an observation-glass having exterior sides angular with reference to its axis, mounted within each cell, a wedge-packing for each glass, and retaining-caps, substantially as set forth.

31. In a lubricating apparatus, an oil-reservoir having a tubular chamber forming a part thereof and an intersecting oil-feed pipe, combined with observation-glasses having surfaces arranged to produce internal reflection, and means for mounting said glasses within said tubular chamber, substantially as set forth.

32. In a lubricating apparatus, an oil-reservoir having a tubular chamber forming a part thereof and an intersecting oil-feed pipe, combined with observation-glasses having exterior sides angular with respect to their axes, cells for containing the observation-glasses, a packing around each glass, and means for forcing the packing into contact with the angular sides of the glass and the inner wall of its cell, substantially as set forth.

33. In a lubricator, the combination with an observation-chamber through which the oil ascends in drops, of a removable cell arranged in relation to said chamber, and a thick observation-glass removably mounted in said cell, said glass having parallel front and rear ends and side surfaces adapted to inwardly direct rays of light in order to exhibit the position and movement of liquid behind the glass, substantially as set forth.

34. In a lubricator, the combination with an observation-chamber through which the oil ascends in drops, of a thick observation-glass suitably mounted in relation to said chamber, a tapered or wedge-shaped packing surrounding said glass, and a cap for compressing the packing around the glass, substantially as set forth.

35. In a lubricator, the combination with a condensation-chamber, of an oil-reservoir, a plurality of sight-feed features comprising tubular chambers arranged horizontally adjacent to each other and having observation-glasses at opposite ends thereof so as to enable inspection from common points of observation on opposite sides of the lubricator and extending in a direction crosswise the reservoir, oil-feeds to the sight-feeds, and an independent equalizing-tube leading from the steam-space of the condenser to each sight-feed.

In testimony whereof we hereunto set our hands and seals.

CLARENCE B. HODGES. [L. S.]
FREDERICK W. HODGES. [L. S.]

In presence of—
AMELIA WILLIAMS
EDWARD D. AULT